(12) United States Patent
Assadollahi (10) Patent No.: US 9,195,662 B2
(45) Date of Patent: Nov. 24, 2015

(54) ONLINE ANALYSIS AND DISPLAY OF CORRELATED INFORMATION

(75) Inventor: Ramin O. Assadollahi, Munich (DE)

(73) Assignee: ExB Asset Management GmbH, Munich (DE)

(*) Notice: Subject to any disclaimer, the term of this patent is extended or adjusted under 35 U.S.C. 154(b) by 634 days.

(21) Appl. No.: 13/578,138

(22) PCT Filed: Feb. 9, 2011

(86) PCT No.: PCT/EP2011/000592
§ 371 (c)(1),
(2), (4) Date: Oct. 16, 2012

(87) PCT Pub. No.: WO2011/098259
PCT Pub. Date: Aug. 18, 2011

(65) Prior Publication Data
US 2013/0055076 A1     Feb. 28, 2013

(30) Foreign Application Priority Data

Feb. 9, 2010  (EP) ..................................... 10153115

(51) Int. Cl.
| G06F 17/22 | (2006.01) |
| G06F 17/30 | (2006.01) |
| G06F 3/0482 | (2013.01) |
| G06Q 10/10 | (2012.01) |

(52) U.S. Cl.
CPC ........ *G06F 17/30014* (2013.01); *G06F 3/0482* (2013.01); *G06F 17/30864* (2013.01); *G06Q 10/10* (2013.01)

(58) Field of Classification Search
None
See application file for complete search history.

(56) References Cited

U.S. PATENT DOCUMENTS

| 5,765,149 | A  | * | 6/1998  | Burrows ............................. 1/1 |
| 7,506,252 | B2 | * | 3/2009  | Blumberg ...................... 715/256 |
| 8,018,439 | B2 | * | 9/2011  | LaPointe et al. ............... 345/168 |
| 8,036,878 | B2 | * | 10/2011 | Assadollahi .................... 704/10 |
| 8,099,416 | B2 | * | 1/2012  | Qiu et al. ........................ 707/741 |
| 8,117,540 | B2 | * | 2/2012  | Assadollahi .................. 715/256 |
| 8,204,921 | B2 | * | 6/2012  | Unruh et al. .................. 707/899 |
| 2004/0168131 | A1 | * | 8/2004 | Blumberg ...................... 715/534 |
| 2006/0265208 | A1 | * | 11/2006 | Assadollahi ...................... 704/9 |
| 2007/0285397 | A1 | * | 12/2007 | LaPointe et al. ............... 345/169 |
| 2008/0072143 | A1 | * | 3/2008  | Assadollahi .................. 715/261 |
| 2008/0077570 | A1 | * | 3/2008  | Tang et al. ........................ 707/5 |

(Continued)

OTHER PUBLICATIONS

G. Navarro "Indexing and Searching", Jan. 1, 1998, pp. 191-228.*

(Continued)

*Primary Examiner* — Maikhanh Nguyen
(74) *Attorney, Agent, or Firm* — Saile Ackerman LLC; Stephanie B. Ackerman; Rosemary L. S. Pike (57) ABSTRACT

The invention relates to the field of user interfaces for computing devices. In particular, it relates to a method and system for analyzing and displaying informational entities which are associated to a text document on a computing device, such as a work station, a desktop computer, a tablet PC, a laptop computer and/or a mobile device. A method for displaying an associated informational entity on a computing device when processing a text document is described. The method may comprise: displaying text of the text document on a display of the computing device; automatically determining a first informational entity which is associated with a first portion of the displayed text; and automatically displaying the first informational entity on the display.

18 Claims, 2 Drawing Sheets

(56) References Cited

U.S. PATENT DOCUMENTS

2008/0263015 A1* 10/2008 Qiu et al. .................... 707/3
2009/0037371 A1*  2/2009 Unruh et al. ................ 707/2
2010/0312837 A1* 12/2010 Bodapati et al. ............ 709/206

OTHER PUBLICATIONS

European Search Report 10153115.0-2201 Mail date—Oct. 11, 2010, ExB Asset Management GmbH.
"On the Use of Information Retrieval Techniques for the Automatic Construction of Hypertext," by Maristella Agosti et al, Information Processing & Management, vol. 33, No. 2, pp. 133-144, 1997 Elsevier Science Ltd, PII: S0306-4573(96)00058-1, published Mar. 1, 1997.
"Automatic Text Browsing Using Vector Space Model," by Amit Singhal et al., XP-002602167, pp. 318-324, published May 1995, Cornell University, Ithaca, NY.
"Topic-Based Browsing Within a Digital Library Using Keyphrases," by Steve Jones and Gordon Paynter, The University of Waikato, Hamilton, New Zealand, pp. 114-121, Aug. 11, 1999.
"Term-Weighting Approaches in Automatic Text Retrieval," by Salton et al., Information Processing & Management, vol. 24, No. 5, pp. 513-523, Jan. 1988.
"Building Hypertext Using Information Retrieval," by James Allan, Information Processing & Management, vol. 33, No. 2, pp. 145-159, Mar. 1997.
CiteSeer: An Autonomous Web Agent for Automatic Retrieval and Identification of Interesting Publications, by Bollacker et al, XP-002519189, 2nd International ACM Conf. on Autonomous Agents, pp. 116-123, ACM Press, May, 1998.
Communication pursuant to Article 94(3) EPC 10 153 115.0-2201 Mailed: Jun. 28, 2012, ExB Asset Management GmbH.
Korean Office Action App No. 10-2012-7023167 Mailed: Mar. 27, 2014 Original Korean language and English translation, EXB Asset Management GmbH.

* cited by examiner

ONLINE ANALYSIS AND DISPLAY OF CORRELATED INFORMATION

The invention relates to the field of user interfaces for computing devices. In particular, it relates to a method and system for analyzing and displaying informational entities which are associated to a text document on a computing device, such as a work station, a desktop computer, a tablet PC, a laptop computer and/or a mobile device.

Retrieving information and navigating through information on a computer or a mobile device can be cumbersome. Not only has a user to learn the specifics of the interface of a certain application, i.e. the user interface concept, the window layout and the menu structure, but he also has to learn where within the application the intended information is stored, i.e. the organization of the information within the application and the data model. From a usability aspect the situation becomes even more complicated when the type of information which is manipulated is taken into account. By way of example, there are applications for organizing pictures, applications for organizing contacts, applications for organizing music and many other applications for manipulating many other types of information entities. This means that the user has to learn and get accustomed to all of these user interfaces and their respective data models. Furthermore, the user has to use the different application in order to retrieve different informational entities.

Especially for consumer computers and mobile devices, it is clearly desirable to have one unified approach for organizing and navigating data in order to enhance the ease of use and to drive down the "mental costs" for a user to learn how to use the different applications on a system. In particular, it is desirable to provide a user interface which automatically determines and displays informational entities which are associated with a text document which is read or edited by a user.

According to an aspect, a method for displaying an associated informational entity on a computing device when processing, in particular when producing, an electronic text document is described. A computing device may be e.g. a workstation, a desktop computer, a laptop or a tablet PC, or a handheld or wireless device, such as a mobile phone or a PDA. Possible informational entities may be Contacts from a Contact Database; Places, such as cities or special places of interest, from a geographical database; Things, such as document files, picture files, music files and video files, from a File storage application, Web sites from a Web browser application or Emails from an Email application. In more general terms, the entities, which will also be referred to as informational entities or items, may be data units comprising a name tag for identification purposes and a plurality of content elements comprising additional information or attributes of the data unit. By way of example, an entity may be the Contact data unit in a Contact databank having a name tag which corresponds to the name of a person and a plurality of content elements or attributes such as the person's address, telephone number, Email address, etc. In a further example, an informational entity may be a data file, e.g. a music file, a picture file, a contact data file, a file representing a time instant, a file representing a location, an email file, a document file.

The text document may be a particular informational entity. By way of example, the text document may be an electronic mail being composed or produced by a user of the computing device. The displayed text may be text from a "subject" line or a body of the electronic mail. In another example, the text document may be a document received and opened on the computing device. Different portions of the text are displayed on the screen when scrolling through the text document. As such, the text of the text document relates to passive text sections of the informational entity, i.e. text sections which are not related to a particular function. Furthermore, the text of the text document relates to free text sections, i.e. text sections which are not submitted to particular semantic constraints. By way of example, the text does not correspond to a constrained email "to" field which requires the entering of a particular email address format or command lines, which require the entering of valid commands.

The method may comprise the step of displaying text of the text document on a display of the computing device. The text may be displayed e.g. while writing the text or while scrolling through the text. As indicated above, the text is typically not subjected to semantic and/or format and/or functional constraints.

The method may comprise the step of automatically determining a first informational entity which is associated with a first portion of the displayed text. A first portion of the displayed text may be a set of words, e.g. one, two, three, four or five words, or a sentence from the displayed text. The step of determining a first entity is not subjected to an explicit "search" command issued by a user of the computing device. The automatic determining step may comprise the step of determining a relevance score for at least two of the informational entities of the set of informational entities stored on the computing device; and the step of determining the first informational entity as the informational entity having the highest relevance score. In particular, the automatic determining step may comprise the step of removing high frequency words from the first portion of the displayed text, thereby yielding a remaining text; and/or determining the relevance score as a degree of overlap between the remaining text and entities of a set of informational entities stored on the computing device; and/or determining the first informational entity as the entity having the highest degree of overlap. In other words, the first entity may be determined based on a "similarity" investigation between the first portion and a set of entities stored on the computing device. Such similarity investigation differs from a pure keyword search which is limited to the determination of exact matches between the keywords and excerpts of other text documents.

The method may comprise the step of automatically displaying the first informational entity on the display. In other words, along with text of the text document the first entity, or an indicia representing the first entity, may be displayed on the screen of the computing device. This may be done in a separate window. A user of the computing device may therefore easily access the first entity, e.g. by clicking onto the displayed indicia.

The method is particularly useful in the context of a network of informational entities stored on the computing device. In such cases, the set of informational entities may be stored with a corresponding plurality of association records. The association record corresponding to the first entity may indicate an association and/or an association strength between the first entity and another entity. The network of associated entities may be used in order to determine the another entity associated to the first entity; and/or to display the another entity. In other words, the stored knowledge on associations between informational entities may be used to determine entities which are correlated to the first portion of displayed text.

Furthermore, plurality of frequency indicators of corresponding may be stored, wherein a frequency indicator corresponding to the first entity indicates the frequency of access to the entity. The frequency indicators are typically increased whenever the corresponding entity is accessed. I.e. the method may comprise the step of increasing a first frequency indicator by a first value, when a corresponding first entity is accessed. However, in view of possible associations between entities, such access to a first entity should also have an impact on the access frequencies of its associated entities. In other words, the increased frequency should radiate to the associated entities. As such, the method may comprise the step of increasing a second frequency indicator of a second entity by a second value, wherein the second entity is associated with the first entity. The second value may depend on the association strength between the first and second entity; and/or the second value may be based on the first value. Typically, the second value should decrease with a decreasing degree of association between the first and second entity.

As such, once a first entity has been determined from the first portion of text of the text document, the associations stored in the network of informational entities may be used to determine other relevant entities which may be displayed on the display of the computing device. The selection, of other relevant entities may depend on the association strength to the respective entity and/or on the access frequency of the respective entity.

As outlined above, the step of determining the first entity may comprise the removal of high frequency words from the first portion of text. These high frequency words may be stored in a list of high frequency words on the computing device. Furthermore, the list of high frequency words typically comprises the words in a given language having a high frequency of occurrence within a text corpus of a given language. By way of example, the list of high frequency words may comprise 10%, 20%, 30%, 40% or 50% of the most frequently used words from a text corpus.

The step of determining a degree of overlap between the remaining text and a stored entity may comprise the step of removing the high frequency words from the stored entity, thereby yielding a remaining stored entity; and/or of determining a number of occurrences of the remaining text in the remaining stored entity. Furthermore, the absolute number of occurrences of the remaining text within the remaining stored entity may be normalized by the length of the remaining stored entity. For this purpose, the method may comprise the step of determining a length of the remaining stored entity; and/or of determining a relative number of occurrences as the number of occurrences divided by the length, thereby yielding the degree of overlap.

When evaluating the degree of overlap, it may be taken into account that only fractions of the remaining text appear in the remaining stored entity. By way of example, the number of occurrences of the remaining text may be determined by determining the number of occurrences of a fraction, e.g. a first quarter, of the remaining text. This number of occurrences of a fraction may be weighted by the length of the fraction, e.g. a quarter, of the remaining text. In an embodiment, the number of occurrences of the remaining text may be determined as the sum of the number of occurrences of various fractions of the remaining text, weighted by the respective length of the fraction.

The step of determining a degree of overlap between the remaining text and the stored entity may further comprises the step of determining a number of entities within the stored list of entities which comprises the remaining text; and/or the step of dividing the relative number of occurrences by the number of entities within the stored list of entities which comprises the remaining text, thereby yielding the degree of overlap. As a consequence, remaining text which is commonly found within the stored entities is penalized, compared to remaining text which is relatively unique.

The step of determining a first informational entity may comprise the step of segmenting an entity of the set of informational entities stored on the computing device; and/or the step of determining the degree of overlap between the remaining text and a segment of the entity of the set of informational entities stored on the computing device. In other words, the method may be further refined to identify specific segments within the stored entities which correlate with the first portion of the displayed text.

The step of determining a first informational entity may further comprise the step of determining an access frequency to an entity of the set of informational entities stored on the computing device; and/or the step of weighting the degree of overlap of the entity by the access frequency. An access to an entity may comprise the "opening" or "usage" of the entity by a user or a processor. By way of example, a picture file may be accessed by opening the picture file and by displaying the picture on the screen. The access frequency may be a counter which is increased upon each access to the respective entity. Furthermore, the access frequency may fade with time, in order to emphasize a recent access over an access which lies in the past. In addition, the access frequency may be a relative access frequency, normalized over all accesses to informational entities within a time period.

The method may comprise the steps of determining a first plurality of associated entities; and/or of displaying the first plurality of associated entities by order of their degree of overlap. In other words, the first plurality of associated entities is displayed, i.e. their corresponding indicia are displayed, such that an entity having a higher degree of overlap has a higher visual prominence than an entity having a lower degree of overlap.

The method may comprise the steps of determining a second plurality of entities which is associated with a second portion of the displayed text; wherein the second portion is different from the first portion of the displayed text; and/or of determining the cut set of the first plurality of associated entities and the second plurality of associated entities. If the size of the cut set is smaller than a threshold value, it is preferably to display the second plurality of associated entities. If the size of the cut set is greater than the threshold value, it is preferable to display the entities comprised within the cut set. In other words, the method may determine if the first portion of text and the second portion of text relate to different, distinct topics, such that the sets of associated entities are disjoint. If the sets are disjoint, then preferably both sets are displayed on the screen. Otherwise, if the two sets are not disjoint, then preferably the cut-set of the two sets is displayed.

In a similar manner, the step of determining a first informational entity may comprise the step of progressively extending the first portion of the displayed text used for determining an associated entity, thereby refining the determination of the first entity. I.e. the number of words comprised in the first portion is extended, thereby confining the search for similar informational entities.

In an embodiment, an entity of the set of informational entities is assigned to or associated with a universal category of a list of universal categories. The list of universal categories may comprise a category associated with "People", a category associated with "Places", a category associated with "Time", and a category associated with "Things". As such, the informational entities may be represented according to the structure provided by the universal categories. Consequently, the determined entities, i.e. notably the first entity and the another entity, may be displayed according to their assigned universal category. By way of example, the entities which are associated to the displayed text may be displayed in separate windows, each window being dedicated to a universal category.

According to a further example, a computing device is described. The computing device may comprise a display configured to display text of a text document; and/or a processor configured to automatically determine an informational entity which is associated with a portion of the displayed text. The determining, performed by the processor, may comprise: removing high frequency words from the portion of the displayed text, thereby yielding a remaining text; determining a degree of overlap between the remaining text and entities of a set of informational entities stored on the computing device; and/or determining the associated informational entity as the entity having the highest degree of overlap. The display may be further configured to automatically display the associated informational entity on the display.

The objects and features of the invention will become apparent from the following description of preferred embodiments. The present invention is described in the following by referring to exemplary embodiments illustrated schematically in the accompanying figures, wherein.

Figure 1:
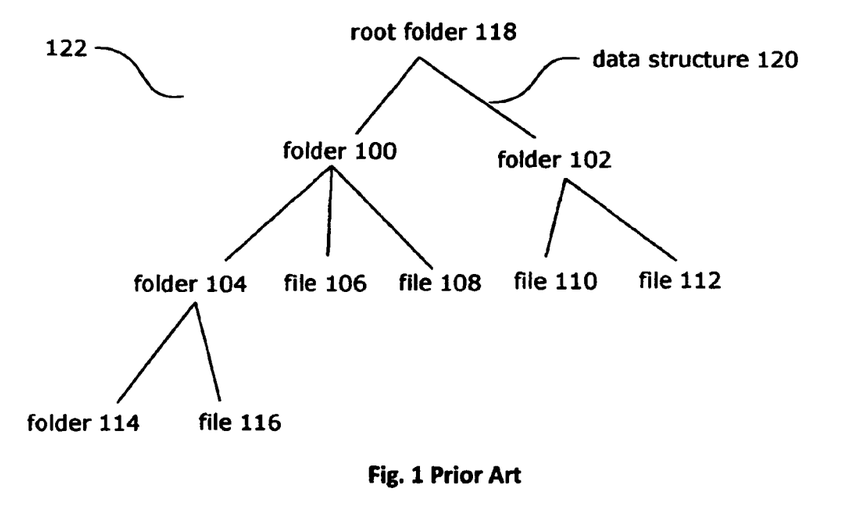
FIG. 1 illustrates a conventional file structure.

Conventional file systems 122 in computer operating systems usually have files (e.g. reference sign 106 in FIG. 1) and folders (e.g. reference sign 100 in FIG. 1). Files typically comprise some kind of data which is often specific for one application or a class of applications, for example "jpg" picture files. When opening these files, usually the operating system looks at extensions of the filenames or similar (external) information to deduce what application to use for processing them. For example, a file with the extension ".jpg" is associated with software that is able to display pictures or organize pictures.

In conventional file systems, files are usually kept in folders 118, 100, 102, 104, 114 that group files 106, 108, 110, 112, 116 together. Usually, a file is only kept in one place, i.e. within exactly one folder. A folder is a data structure 120 stored in memory that keeps record of what files and other folders are stored within it. While folders can comprise other folders (e.g. folder 100 within folder 118), files cannot comprise folders. Usually, file systems have a so-called root folder 118 which is the "mother" of all folders. Thus conventional file systems are organized in a hierarchical way: The root folder 118 comprises files and other folders 100, 102, these other folders 100 again comprise folders 104, files 106, 108 and so on. This inevitably yields a tree-like structure 122 as illustrated in FIG. 1.

At least three aspects of the described conventional file systems appear to be problematic:

1) A file can be kept in one place only. This may be problematic if the computer user, e.g. a project manager, wants to have one file available for multiple projects. The conventional way to address this problem is to generate multiple copies of the file and have them stored in different folders. This, however, leads to data integrity issues, as well as to an increase in the required storage space.

2) The concept of a hierarchical, tree-like organization may not be adequate when it comes to representing complex interdependencies between different files. Such interdependencies may reflect the passive or active knowledge of the user of the computing device. One hierarchy of files may be adequate for representing a certain aspect of a topic, while a different hierarchy of files may be adequate for representing a different aspect. Thus it is complicated for the user to think about a suitable hierarchy ex ante and even this may turn out inadequate at a later stage. It should be added that conventional file systems do not have much insight about the content of files such that the retrieval of information comprised within a file may be problematic. In other words, a hierarchical, tree-like organization of data does not appear to be appropriate for a targeted retrieval of files and of information comprised within the files.

3) The tree-like organization of folders and files translates to long travels for the user through hierarchies of the file/folder tree. Conventional file browsers such as the Microsoft Explorer require the user to double-click a folder to reveal its content. Thus, if projects are organized in a deep hierarchical file system, it requires the user to perform many clicks to get to the desired file.

To find documents across a folder hierarchy, i.e. to support the user to find documents for which the user does not know the storage location within the file structure, conventional computer operating systems (OS) provide programs running in the background that maintain search indices. These search engines "look into" files in order to maintain a list of search indices. When invoked by the user, search engines put out a list of documents based on whether the documents contain one or more given search words (also called key words). Conventional search engines maintain a simple "reverse lookup index" (RLI) that stores for each word in a vocabulary the documents within which the word occurs. When the user enters a word in the search engine, it is looked up and the documents which comprise the particular word are presented to the user. To maintain the RLI, every document has to be indexed. This can be triggered whenever a document is added to the system. It should be noted, however, that the RLI does not provide any information with regards to the overall similarity of documents. The RLI is purely based on the identification of key words.

Figure 2:
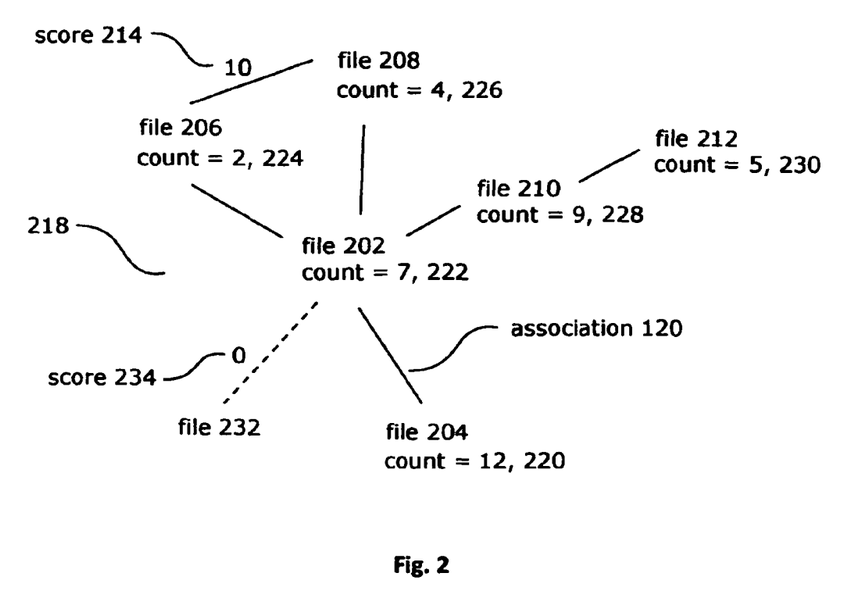
FIG. 2 illustrates a networked file structure.

The above mentioned weaknesses of conventional file systems are addressed in the present document by introducing an associative, networked way of representing data and by automatically generating associations between the stored data. Such a networked representation 218 of files and the associations between the files is illustrated in FIG. 2. When using a networked representation 218, a file 202 can be arbitrarily associated to other files 206, 208, 210, 204 and vice versa. The association between files is depicted by connecting lines 120 in FIG. 2. Thus, there is no hierarchy between the files anymore. The user can navigate from file 202 to file 208 via 206 or to file 206 from file 208. As such, the networked representation 218 may be used to flexibly describe associations between all files within the network and to thereby enable flexible means of data retrieval.

A conversion process from a conventional file system to the networked file system will be described in further detail below. Such conversion process may involve the generation of new files that correspond to folders in the conventional file system. In this way, the former hierarchical organization of the files and folders can be preserved while adding the benefits of a networked file representation. By way of example, file 202 may have been a folder prior to the conversion from a hierarchical file system to a networked file system. The former folder 202 may have comprised files 206 and 208, as well as former folder 210 (which has also been converted into a file) as a sub-folder that comprised file 212 as a further sub-folder.

The automatic generation of a network of knowledge, i.e. a network of associations between the files, relies on the analysis of the content of the files and allows for associating files to each other that are similar with regards to their content. Thus, the networked file system maintains additional information with each file about the files which are associated with this file. The retrieval of one document or file can therefore lead to the "co-activation" of other documents or files of similar content which are associated with the retrieved document or file.

It should be noted that the networked representation 218 of a file system may be used as integral part of the file system or as an additional access layer on top of a differently structured file system.

As indicated above, the content of multiple documents may be analyzed and different documents having similar content may be associated with each other. In addition to a RLI, a record may be maintained for each document or file, or more generally, for each informational entity. The record comprises a list of documents or files associated to the particular document or file.

The detection and the indication of a relationship between documents may be based on a score 214 that represents the degree of a relationship between the documents. For example, if the score 234 is zero, there is no association between two documents (as denoted by the dashed line between file 202 and file 232). A higher score indicates a stronger association between the documents or files. Every association (indicated by the solid lines 120) between two files would have a score indicating the strength of the association.

The score can be user-defined or computed automatically. In an embodiment, the user is enabled to manually associate files with each other and build up a network of documents without the help of automatic association. Such manual association may be supported by a graphical user interface facilitating the association between two or more informational entities, e.g. documents or files, and facilitating the setting of scores or association strengths. However, it is desirable for large document collections that documents may be associated automatically and their scores set accordingly.

The score indicating the association strength may be for example a result of the document similarity. I.e. the score may depend on how similar two documents are with regards to a given aspect of their content. If two documents are not similar, the document similarity calculation may result in a score of zero (reference sign 234) and the two documents may not be associated (e.g. file 202 and file 232).

Whenever the user retrieves a particular document, the networked file system may also list documents that are similar, i.e. that are strongly associated, to the retrieved document, i.e. documents which are associated with the retrieved document. It should be noted that the document similarity is different from simple sharing of the same key words. By way of example, the retrieved document may have been selected according to a search word but the associated documents which are listed in conjunction with the retrieved document may not need to comprise the search word. This may lead to a superior performance in comparison to a plain RLI based search engine.

Document similarity may be computed in different ways. The document similarity may be used to decide whether or not two informational entities that contain text or other information are similar enough to justify an association and further, how strong this association should be.

In one implementation, the similarity of two texts may be assessed by first filtering out high frequency words, i.e. words that occur very often in text corpora such as "a", "the", "and" and so forth. Typically, high frequency words do not carry too much semantic focus. In a next step, a list of unique words for each of the two texts in question may be built based on the remainder of the aforementioned frequency filtering. Next, the cut set of words of the two documents may be computed in order to assess the extent of the overlap of the remaining words. This may be an initial way to decide whether two documents or texts are similar or not.

A refinement may be a weighting of the words in the cut set according to some score. The text book on statistical natural language processing ("Foundations of statistical natural language processing" by C. D. Schütze and H. Manning, incorporated by reference) describes a weighting scheme called "td.idf" which suggests a weighting given by the "word frequency" multiplied by the "inverse document frequency", i.e. the frequency of occurrence of a word within one document divided by the relative number of documents in a document collection within which the word occurs. Consequently, words that occur often within one document, but are rarely used in other documents will be considered to be important. The best score for a word will be achieved when it occurs rarely in the document collection as well as very often in a single document.

The problem with such a weighting in the context of the creation of a networked file system is that a document collection, i.e. a file system, is built up from scratch. Consequently, when documents are analyzed and compared in an early stage of the build up of the file system, the weighting of words will be different compared to documents which are analysed at a later stage. This is generally not desirable.

This problem may be addressed by using the general word frequency as opposed to document frequency. This implies that the analysing system would use a pre-loaded dictionary containing the words of the language together with their frequency when it is delivered to the user. A second possibility would be to have such a pre-loaded dictionary together with document frequencies obtained from a corpus reflecting typical user data. In both cases, the individual, subjective importance of a word would be less important as when looking at the user's documents themselves. A further possibility would be to analyse the whole set of documents stored in a file system and to collect word frequencies in a first run and to then associate documents using such word frequencies in a second run.

Further factors which may be taken into account when analyzing the similarity of documents is the length of the text (or the different number of unique words in the texts). In order to consider to associate two documents, there may be a rule applied that the two documents need to have approximately the same number of unique words.

Moreover, not only a list of single words but phrases of two or more words may be used to decide on the similarity of texts. This may influence the precision of the decision. Consider the two sentences "The car is broken." vs "The car is not broken." First, "The" and "is" may be filtered out for being high frequency words. Then the sentences would have an overlap of $2/3$ ("car" and "broken" shared, "not" not shared). This may qualify the texts to be associated. When employing phrases of only two words the overlap would be reduced, i.e. "car broken" vs "car not" & "not broken". Consequently, the quality of the analysis on similarity may be increased by increasing the length of phrases which are to be compared.

The method of building associations between documents may be further extended by segmenting documents before associating other documents to selected segments. For example, a book may be divided into chapters or a description of a product may be broken down into different aspects of the product (pictures, installation, handling, cleaning or technical specification). Such segmentation would increase the accuracy of the associated documents. The records for maintaining associations between documents would then be extended to records for maintaining associations between segments of documents.

Documents within the network representation 218 may be further associated with a counter that indicates the frequency by which the document has been accessed by the user. By way of example, file 204 in FIG. 2 has been accessed 12 times as depicted by the counter 220. According to an aspect, documents which are associated with a retrieved document may also increase their frequency even though they have not been accessed by the user. This frequency increase may be equal or less than the frequency increase of the document actually retrieved. For example, if the retrieved document 202 incurs an increase in usage frequency of 10 when it is accessed by the user, its associated documents 204, 210, 208, 206 may incur an increase of 5. Such a co-activation based increase may extend even to documents of second order in the network (e.g. a frequency increase of file 212 through file 210 when originally file 202 was activated/accessed). The strength of the increase may take the distribution of a Gaussian curve or the inherited frequency increase may reduce exponentially with the number of intermediate files, i.e. intermediate informational entities. Furthermore, the strength of the increase may depend on or be weighted by the association strength, i.e. by the score. Such a weight may be computed by adding up the association strengths of all directly associated connections and dividing each of them by this sum yielding a weight between 0.0 and 1.0.

It should be noted that the document access-frequencies may be used to present those files or entities of a selected set of files to a user which have the highest access-frequencies. By way of example, if the user retrieves file 202, the associated files 206, 208, 210 and 204 may be presented to the user ranked by their counts, i.e. ranked by the usage frequencies. Consequently the files would be displayed in the order 204 (count 12, 220), 210 (count 9, 228), 208 (count 4, 226), and 206 (count 2, 224).

As the networked representation 218 of files has no root file or folder, the initiation of retrieving documents (e.g. the opening of the "Explorer" of Microsoft Windows or the opening of the "Finder" in Mac OS or typing "ls" in Unix shells) has to be different in file systems using a networked representation. It is clearly desirable to present the user with some initial documents so that he can start navigating the data network from different "access points". Such access points may be defined by document clusters, as outlined below. Furthermore, access points may be defined by performing a categorization of the different informational entities. As will be outlined at a later stage, the different informational entities within the network may be assigned to universal categories and sub-categories, and thereby create an hierarchical overlay representation which may be used to provide appropriate access points.

Clusters of documents are groups of documents which are strongly interconnected among each other but not or not strongly connected to other clusters. At the initiation of a retrieval session, the user thus may get a couple of documents presented all of which refer to one cluster. The presented documents typically have the highest access-frequency for their cluster. For the example given in FIG. 2, there are two clusters, the network around file 202 and the file 232 which are not mutually associated. The user may retrieve document 202 and get the associated files 204, 210, 208 and 206 presented.

In summary, a networked representation of documents or informational entities has been described. Using the networked representation, different documents may be associated and the associations between the documents may be characterized by association strengths. Furthermore, a record indicating the frequency of access to the different documents may be maintained. Depending on the association strength, the frequency of access to one informational entity may be partly inherited to associated informational entities. This may lead to a view on the file system where only documents with a certain minimum access frequency are presented to the user or upon retrieval of a document only associated documents with a certain minimum access frequency are presented to the user.

Furthermore, the informational entities may be organized in universal categories such as a "people" category, comprising entities with data on individual persons or companies, a "things" category, comprising entities for music files, pictures, emails, etc., a "places" category, comprising entities for countries, cities, buildings, etc., and a "time line" category, comprising entities for time instants. The universal categories may be structured in sub-categories and provide access points to the networked file system. However, regardless the structuring of the informational entities into categories and sub-categories, the informational entities may be freely associated with each other. By way of example, an entity for a "music file" may be associated with an entity for a "person", an entity for a "picture file" may be associated with a "time instant" and/or a "place".

The above mentioned networked representation of entities allows for the arbitrary association between entities of any kind. The association between entities may be implemented by defining an association record with each entity, wherein the association record comprises a link to the entities which are associated with the respective entity. In addition, the association record may indicate the strength of the association between associated entities. Furthermore, a frequency indicator may indicate the frequency by which an informational entity is accessed by a user, thereby facilitating the retrieval and the display of most frequently used entities.

A networked representation of informational entities may be used to store relational knowledge within the network. In particular, the knowledge is stored by the association between different informational entities, as well as by the association strength and by the access frequency. This knowledge can be continuously updated and extended by creating new associations and by updating the association strength and the frequency indicators.

Furthermore, the knowledge stored within a networked representation of informational entities may be used to support the work of knowledge workers, e.g. by correlating currently used informational entities with associated entities. In an embodiment, the perceived content of a document, i.e. an informational entity, may be analyzed in real-time and information which is correlated with the perceived content may be displayed. In the following, an example for such a use of a networked representation of entities is outlined.

Modern computer systems are mostly used for consuming and generating information. Knowledge workers have to review documents, read articles, do research on the Internet and then possibly consolidate the collected knowledge into a new document that is the result of converging and mentally processing the newly acquired knowledge. As indicated above, the user's documents are typically stored in folder structures organized in certain hierarchies (projects or clients, for example). Other information is available on the internet or stored in emails that are in turn stored within an email application.

Consequently, in conventional operation systems, the user has to work on multiple applications learning multiple menu- and organization structures to collect the knowledge of a given field. Even worse, if the knowledge is not readily accessible, the user has to employ local or internet based search engines to find the relevant documents to read.

As such, it is desirable to reduce the strain and effort to collect information of different sorts and from different sources. In particular, it is desirable to present relevant related information at the same time as the user is consuming a source of information, thus shortening the path from reading one document to finding other relevant documents.

In an example case, the user opens a page in the web-browser and gets associated personal knowledge presented, e.g. in a separate window. In a second example, the user receives an email and gets associated knowledge displayed. In other words, the user views a document, e.g. a word file, email or website, and the software analyses the content of that document and immediately shows similar documents that are stored already at the user's device. As a consequence, the user could be provided with the personal context about the new data that he is consuming. If the user reads an article about a certain topic, the document similarity between the current article and the user's document collection could be computed. As a result of such an analysis, the top n documents, i.e. the n most relevant related documents, could be shown to the user.

In other words, it is suggested to present a user with a list of related informational entities, e.g. documents, files, etc., while he is consuming another document or media. As such, the consumption of media is accompanied by already stored, personal data so that the user can easily embed the new knowledge in his personal context. The user's access to associated knowledge is strongly simplified by this concept and the probability that already available knowledge is used to understand the present new data is increased.

Conventional technology would use system-wide search engines that have to be explicitly invoked by the user and the user would subsequently have to enter some keywords to obtain a collection of documents. This conventional approach has several problems: 1) the user has to invoke the search engine, which is already an additional cognitive effort; 2) the user has to choose the right keywords; and 3) the user has to review actively the documents in the results.

The concept of providing the user automatically with associated knowledge aims at reducing the complexity of the procedure of getting to associated knowledge while improving the quality of the matching results. The improved quality of matching results may be achieved by the computation of document similarity rather than a mere keyword match. Furthermore, the storage of the different documents within a network of informational entities allows for the flexible creation and retrieval of associations which may be used to determine appropriate related documents.

In an embodiment, the system would analyze the parts of the document that are actually visible to the user and would only use this portion of the text for matching documents. In current computer environments, a document may be longer than the physical display is able to present. In a similar manner, computer desktops using a plurality of windows may display only a portion of the text to be viewed. Usually the user can navigate through the document to see invisible parts using scrollbars or up/down keys. The search for related documents may be limited to selected portions of the documents, e.g. the displayed portion of the document. By way of example, the search may be restricted to a certain surrounding of the current cursor position. Constraining the automatic document match to only parts of the presented new information can further improve the match quality, and thereby provide the user with more relevant associated documents.

In a further embodiment, the user's documents already residing on the user's computer could be segmented in a way that larger texts are separated into smaller proportions that have different content. By way of example, a book may be segmented into chapters. The user would then only see those portions of these texts that actually match the current data he is viewing. Consequently, in a combined embodiment, segments of a viewed document may be automatically matched with segments of documents stored on the user's computer, thereby providing a high degree of accuracy in terms of document matching.

In more generic terms, it is proposed to present a user with associated information entities when consuming, e.g viewing or listening, a particular informational entity. In even more generic terms, the user is presented with portions of informational entities which are associated with a portion of the informational entity that he is currently consuming. In order to identify the relevant associated information, the above described networked representation of informational entities may be used. When consuming a new informational entity, i.e. an entity which has not yet been associated with other entities within the network, various associating means may be used to automatically identify relevant associated informational entities. These associations may then be stored in the network of entities, thereby including the new informational entity within the network and thereby creating and storing new knowledge.

The association means preferably analyze the similarity of informational entities. However, association means may also make use of RLI and/or keyword matching methods. Furthermore, the association means may rely on manual interaction with the user.

In a further embodiment, the association between informational entities may be used to provide online suggestions of supplementary data while producing a new document. When a user composes a new document such as an email comprising recipients, a subject line, a body text and attachments, the user usually has to access different applications, e.g. a contacts database or a file browser, in order to find and assemble the relevant information. The effort for composing such a document may be reduced by re-arranging the sequential order with which the document is composed. In a proposed mode the user actually starts writing a text and the system analyses the text to make suggestions on suitable other components for the new document. In other words, the edited text is analyzed in order to identify relevant informational entities which may be relevant for the composing of the text. As a result, the user is enabled to simply select a relevant entity, e.g. an email address of the person that he is addressing in the text, from the presented list, instead of working through different applications or folder structures in a hierarchical file system.

For example, if the user started an email with "Hey John", the system would suggest suitable recipients from a contacts database or similar. If the user gives further hints in the text about who the recipient could be, the system could further constrain or provide further suggestions for the possible list of recipients. A simple example would be that the last name of the recipient is also provided, thereby restricting the presented informational entities, e.g. the contact items, to people having the written last name. However, more complex background knowledge may be used to further constrain the list of suggestions or to identify other relevant associated informational entities. E.g. the text may read "how is Jane?", and the system may have a representation that one of the people with the first name "John" in the database is married to "Jane". In such cases, the entities of "John" and "Jane" may be presented to the user. Such relationships between informational entities may be stored and maintained in a networked representation of informational entities as outlined above. A further example for such an indirectly associated entity may be the name of a company for which the recipient "John" works. Consequently, an entity representing the company could be displayed to the user when composing the email.

In general, all sorts of associated information may be used to generate a list of ranked candidates. For identifying appropriate informational entities which should be presented while editing a new informational entity, the above described association means may be used. Furthermore, the knowledge stored within a network of informational entities may be used. In particular, the associations between entities, the respective association strength and the respective frequency indicators may be used, in order to select and rank appropriate informational entities.

In the above example, if the user goes on in writing "Did you know that Michael Jackson is dead?", the system would automatically open up a representation of the artist "Michael Jackson" and a representation of his "songs" in the music collection. When the user goes on writing "I love the song 'Dirty Diana'", the proposed set of data would be further constrained towards a subset of Michael Jackson's music, in particular to the song "Dirty Diana" or the songs of albums on which the particular song occurs. Consequently, contextual information within the composed document may be used to refine the list of appropriate associated entities.

Furthermore, it is contemplated that the proposed system is configured to identify distinct portions of the composed document. By way of example, the system is able to compute that the content of "hey John, how is Jane?" is not related to "Did you know Michael Jackson is dead?". This could be done by identifying clusters of associated information as indicated above. In the current example, it could be identified that the content "hey John, how is Jane?" triggers a list of associated entities which is only very loosely related to the list of associated entities of the content "Did you know Michael Jackson is dead?". In such cases, the system may be configured to maintain both lists of associated entities and to manage both lists of associated entities separately, or to maintain a unification of both lists. The system would continuously aggregate associated content and refine these suggestions during the user's production of the text. Such refinement would, however, by performed separately for the different lists or clusters.

As outlined above, the system may identify and display representations of files that can match parts of the text that the user produces. These files can be presented while the user is working on his main document. Consequently, the composition of complex documents such as emails (consisting of recipients, subject, body and attachments) is simplified in that the user does not have to choose the content of these components from other databases (like contacts for the recipients and the file browser for attachments) but can concentrate on the production of the main document. In an ideal case, the additional information which is provided based on the content of the main document is so relevant that the user can simply choose from this proposed list of supplemental data, i.e. the retrieval of data from other applications would not be required anymore.

In generic terms, a method and system for supporting the generation of a new informational entity is described. Based on the data provided by the user while generating the new informational entity, a list of associated informational entities is provided to the user, e.g. displayed on the screen. The user may select any of the associated entities and use the information comprised within the list of associated entities for the generation of the new informational entity.

In order to create the list of associated entities, the method and system may make use of the association means described in the present document. Furthermore, the knowledge comprised within a network of informational entities, e.g. the associations, the association strengths and the frequency indicators, may be used.

Above a networked representation of informational entities has been described. In the following a method and system for creating and maintaining associations between informational entities is described. Furthermore, a generic representation of the informational entities is proposed which provides intuitive access points to the networked file system.

In current operating systems, a user has the problem that documents are stored in a tree-like file hierarchy that is not always tailored towards the user's retrieval needs. Usually, the user sets up a folder structure, for example a "work" folder with "client" folders as sub-folders and in turn "project" folders as their sub-folders. Information that is stored in one sub-folder is usually invisible to the user when he is browsing a different part of the tree. As indicated above, conventional systems employ search engines to find documents across file hierarchies. The result of such search engines is often not helpful for the user as usually a list of files is presented with files that contain one or more keywords the user has entered.

In order to overcome these shortcomings, it is suggested to provide an additional representational layer for the files stored on the computing system of the user. This additional representational layer may be combined with the network of informational entities described in this document. The additional representational layer relies on a universal structure applicable to all physical domains. Here, four universal categories or dimensions are suggested and referred to as "people", "things", "places" and "time". An informational entity, e.g. a document, is analyzed with regards to these four universal categories.

In order to analyze a document, detectors are used, henceforth called "Semantic Sensors", which can match certain strings of words in a document to a universal category of the representational layer. The idea behind the analysis is that different excerpts of a document are represented as associations to the four universal classes or categories mentioned above. Thus for example, if a person called "Sven" is mentioned in a document, the semantic sensor could be used to create an association between the category "People" to the informational entity "Sven" and from the entity "Sven" to the document containing that name.

In this way, the user can easily retrieve documents mentioning the person "Sven" when browsing the associations to this informational entity. As a document, i.e. the informational entity comprising the document, can have more than just one associated entity, the user would be able to retrieve documents when having multiple entities in mind. Moreover, a document could have associations to the other aforementioned dimensions so that the user could retrieve documents using entities comprised within the category "places" and "people", for example.

In order to generate relevant informational entities which may be associated to the document, the analyzing system may use passive knowledge about the world. The analyzing system may be aware e.g. that "Sven" is a male first name, that "Nokia" is a company, etc. This passive knowledge may be provided via listings of names, companies, etc. As a consequence, relevant elements from the passive knowledge could be stored as informational entities within the respective universal category. Furthermore, the analysis of the document would lead to an automatic generation of associations between the content of a document and the respective entities. E.g. for an incoming document and if the user did not have the entity "Nokia" stored as a company under the category "people" (or in his contacts application), the analyzing system would use the passive knowledge on company names and would create an entity "Nokia" which would be associated to the incoming document. There could also be other sources of passive knowledge, such as lists of celebrities, cities, countries, sports etc. As such, the analyzing system performs an automatic categorization of documents and the generation of representational hierarchies of their constituents.

The generation of representational hierarchies and associations between entities helps a user to find documents according to the content of the document. This may even be achieved for words that actually do not occur in the document. As an example, a document comprising the word "Nokia" is analyzed. Further there may be Semantic Sensors derived from passive knowledge that describe that Nokia is a company, i.e. that Nokia is associated with the informational entity "companies". The informational entity "companies" may be associated with and/or stored under the universal category (or informational entity) "People". Thus, using the semantic sensor, the analyzing system would generate a hierarchy of People→Companies→Nokia, i.e. the analyzing system would create associations between the document and the entity "Nokia", as well as with the entity "Nokia" and the entity "companies". Consequently, the document could be retrieved by selecting the entity "Companies" and by searching for associated entities. In the above example, if a second document would contain "Samsung" and the Semantic Sensor would contain Samsung as being a company, then this document would be accessible via the entity "Samsung", and also via the entity "Companies". It should be noted that when viewing the entities which are associated with the entity "company", both documents would be displayed, as both documents are somehow associated with the entity "Companies".

In order to perform the above analysis, so-called Named Entity Recognition could be used for the extraction of names from documents. Furthermore, semantic relations may be defined such as an "is-a" relation between representational entities. In the examples above, one could state that "Nokia is-a Company" and "Samsung is-a Company", thereby expressing the hierarchical relationship between the two entities. The combination of recognized named entities and the semantic relations could furthermore be supplemented by rules that establish representational entities showing the hierarchies of these entities. Such a rule could state that the right-hand side of a semantic "is-a" relation as a hierarchically superior entity relative to the left hand-side. Consequently, the rule could be used to create such a representational hierarchy.

It is noted that a document may be analyzed by more than one Semantic Sensor, i.e. various sources of passive knowledge may be used. For example there may be sensors for cities of countries and so forth.

The combination of multiple representational hierarchies, e.g. different representational hierarchies for the different universal categories, allows for the navigation through document selections by using different access points. Thus the user is provided with ample possibilities from a dynamic range of hierarchies to get to a certain document, partly even using words that do not occur in the document itself.

A semantic sensor may also have a more complex structure in that there may be alternatives for an informational entity to match the string of the document. A semantic sensor for the city of Munich may thus be described as "(Munich|Munich OR München OR Muenchen OR Monaco) is-a City". In this case, the semantic sensor may generate Munich (the word before the pipe character|) whenever one of the words followed by the pipe character is matched to a string in the text.

It should be noted that the described analyzing system differs from a technique that is referred to as "tagging texts" which means that usually the author or the owner of a document adds tags or keywords to a text to make it retrievable. In particular, the described analyzing system differs in that it matches parts of the text against databases that pre-exist for the respective semantic sensor, i.e. it matches segments of a document against preexisting passive knowledge. Furthermore, the semantic sensors apply semantic rules which are used to generate and to associate entities with sub-categories, e.g. to associate the entity "Munich" with the sub-category "Cities". Finally, the sub-categories and/or the entities are associated with one of the four universal categories "People", "Things", "Places" or "Time".

This means that the user can retrieve documents according to the natural semantic of the entities which he can most easily remember. These access points could be on different levels of the representational hierarchy, e.g. on the universal category level "People", or on sub levels such as "Cities" or on the actual instances such as "Sven".

Overall, the above mentioned analysis of incoming documents using semantic sensors and the creation of associations across a representational hierarchy helps the user to find a document more easily with only a few steps of retrieval.

Figure 3:
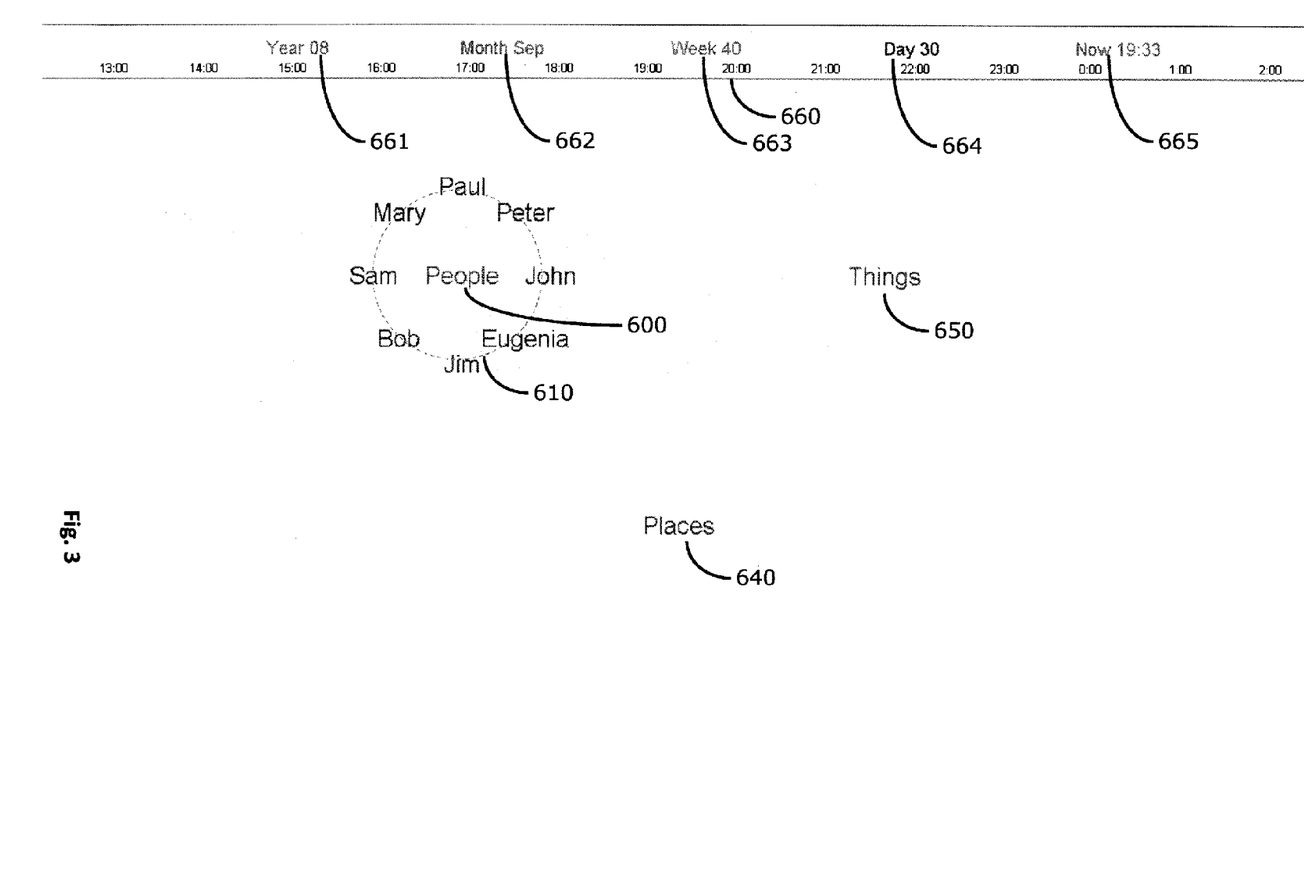
FIG. 3 illustrates a user interface making use of a networked file structure.

Reference is now made to FIG. 3, which illustrates a graphical user interface making use of the networked file structure described above. By way of example, the networked file structure could be used to implement a consumer computer with a touch screen that allows for the use and organization of various types of information, such as music, pictures, videos, email, contacts, appointments and websites. All this data can be organized and represented by the present invention in a synergetic way while departing from conventional concepts such as windows, files, folder hierarchies and applications. For a consumer computer, it is typically desirable to give a user direct access to the data he/she is keeping. At the same time, it is also desirable to keep the user interface as simple as possible. As already mentioned, one drawback of conventional computer user interfaces is that there are different applications for different types of data, e.g. a music player for music files, a picture viewer for pictures, an email application for emails, a browser for websites and so on. All of these applications have specific interfaces and menus that the user has to learn and get accustomed to. At the same time, the computer does not help the user to fully exploit the power of the data that is stored in it. For example, it is not simple to find out who the friends or preferred contacts of a specific contact are, or who else lives in a particular city, or how that city looks like or when the user of the computer has visited that city last. In other words, the synergies between the applications and their local data cannot be leveraged in a satisfactory manner when using prior art user interfaces.

It should be noted that the graphical user interface is particularly well suited for man-machine or user interfaces that do not require a keyboard. By way of example, the methods could be implemented as a user interface of a tablet PC that could be operated entirely with a user's finger or with a pen. The user input would comprise the pointing at or the clicking on indicia representing entities on a screen and also the moving of those indicia. By bringing the indicia into the vicinity of one another, associations between the different related entities could be made which would enable a user to easily and intuitively retrieve a specific entity from the mass of data stored on the tablet PC. Upon the selection of the specific entity a desired set of functions, such as Writing of Emails, etc., may be performed.

As illustrated the user interface could display the four universal categories, i.e. Time 660, People 600, Things 650 and Places 640. All of these categories, which are implemented as informational entities, may reveal their associated data at the touch of a finger or at the mouse-click of a user. In the illustrated example, the "Time" category 660 is represented at a time bar, on which time dependent events, such as meetings, arrivals of emails, music and so forth, would be arranged and displayed. It should be noted that this presentation is only one possible way of representation and that associated informational entities may be presented in various different ways. The synergies of such a unique presentation of a time bar, on which various time-dependent entities may be shown, arises from the fact that only one time line is available and required for the whole system.

Not only can the user put events on the time line, the user can also drag dates from the time line to constrain the selection of data in the other categories. By doing so, a specific date of a certain interval of time may become an influencing entity for another activated entity. It should also be noted that the time line may be organized using different resolutions so that the user can switch between "days" 664, "weeks" 663, "months" 662, "years" 661 and so forth. Furthermore, by clicking the entity "now" 665, the user may be enabled to set the time ray to the current date and time.

FIG. 3 shows a further category "People" 600, which could comprise all information about the contacts that are known to the user. Such contacts may be organizations such as companies, hotels, restaurants and so forth, as well as people known to the device user. In other words, the entity "People" 600 could comprise a list of associated entities representing contact data. The illustrated user interface would allow a user to not only drag out one specific person from the list of associated entities and view the other people associated with this person, but it would also allow a user to drag out an entity representing a company name and view all the people working for this company as a list of associated entities. Furthermore, the user could drag an entity representing a person onto a specific time instance on the time bar 660, in order to obtain a list of associated entities having a relation with both the selected person and the selected time instance.

In addition, FIG. 3 shows a "Things" category 650, which could comprise all sorts of data that a user stores, such as emails, pictures and music. Similar to the other categories, also the "Things" category 650 is an informational entity that may have further associations, i.e. further associated entities, which appear on a screen, if selected by a user. By way of example, clicking on the entity "Things" 650 may trigger the display of a list of associated entities, such as emails, videos, music, pictures, websites. These associated entities may again each comprise a list of associated entities and so forth. At any time, the dragging of an influencing entity into the proximity of such an activated entity will influence the extent, the content and/or the representation of the list of associated entities.

Finally, FIG. 3 also shows a "Places" category 640, which could be associated with the information regarding the places that are known to the user, such as the contact's addresses, the cities that were visited by the user or that were cited in emails or even websites that the user has viewed. Using the methods described in the present document, the user could easily find out what people live in a particular city, by bringing an entity associated with the particular city into the vicinity of the activated "People" entity 600. The people having a certain relation to that particular city would then be displayed as a list of associated entities 610. As another example, the user could also use the entity related to the particular city to retrieve pictures from the "Things" category 650 which were taken in this city. This is particularly useful if the pictures were taken using a GPS (global positioning system) enabled camera and contain longitude and latitude information of the location that the picture where taken at.

As indicated above, the universal categories 600, 640, 650 and 660 could also have sub-categories associated with them so that emails could be organized in sub-categories and music files could be organized according to genres, artists and album titles.

The graphical user interface can be used to easily exploit the knowledge stored in the network of associated informational entities. In particular, the graphical user interface can be used to perform set operations (e.g. cut-set or union-set operations) on several entities and their respective associated entities.

In a first example, the user could drag out a person from the "People" category 600 and place it near the category "Places" 640. Activating the category "Places" 640 would reveal the address of that person, i.e. the cut-set between the entities associated to the person and the entities associated to the entity "places" is displayed. I.e. if an entity is brought into the vicinity of another entity, i.e. if the distance between both entities is below a threshold, both entities may influence each other and set operations may be performed in order to determine a certain subset of entities associated with both entities.

In another example, the activated entity "Pictures" could be dragged to the time line 660 in order to reveal the pictures sorted by time. If, in addition, the entity associated with a particular person is dragged to the time line 660, then only those pictures associated to that person are shown. Such association between the pictures and a particular person could be established based on the home address of the person, e.g. by associating the GPS data of the pictures with the GPS data of that address. Such association could also be established due to the fact that the person was present at a scheduled meeting, travel or party, which was associated with the pictures. In any case, such association could be reflected via associations stored within the network of informational entities.

In yet another example, dragging the activated entity "Things→Emails" to the time line 660 would show the Emails that were received and sent at the selected point in time. By dragging in addition an entity associated with a person to the time line, the list of Emails could be further restricted to the Emails that were sent to and received from that particular person.

The described methods and systems may be implemented on computer systems, such as work stations, desktop PCs, laptops, tablet PCs, and handheld or wireless devices, such as mobile phones, smart phones, PDAs, etc. They could be used in relation to a user interfaces for the operating systems of such systems and devices and thereby facilitate the interaction between the user and the devices and allow for an intuitive, simple and fast retrieval of data from the memory of the device. As such, the described method and system are particularly useful for data-mining.

The present invention is not limited to the disclosed exemplary scenarios. Other use cases can benefit from the invention as well. This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. A method for displaying an associated informational entity on a computing device when producing a text document; wherein a set of informational entities is stored on the computing device; wherein the set of informational entities is stored with a corresponding plurality of association records; and wherein the association record corresponding to a first informational entity indicates an association and an association strength between the first informational entity and another informational entity; the method comprising:
   editing text of the text document on the computing device;
   automatically determining the first informational entity which is associated with a first portion of the edited text; and
   automatically displaying an indicia for the first informational entity on the display;
wherein the step of determining the first informational entity comprises:
   determining a relevance score for at least two of the informational entities of the set of informational entities stored on the computing device; and
   determining the first informational entity as the informational entity having the highest relevance score; wherein the step of determining the first informational entity comprises:
      removing high frequency words from the first portion of the displayed text, thereby yielding a remaining text;
      determining the relevance score as a degree of overlap between the remaining text and a plurality of informational entities of the set of informational entities stored on the computing device;
      determining the first informational entity as the informational entity having the highest weighted degree of overlap; and
      wherein the high frequency words are stored in a list of high frequency words on the computing device; and/ or the list of high frequency words comprises the words in a given language having a high frequency of occurrence within a text corpus of a given language.

2. The method of claim 1, wherein the step of determining a degree of overlap between the remaining text and a stored entity comprises:
   removing the high frequency words from the stored entity, thereby yielding a remaining stored entity;
   determining a number of occurrences of the remaining text in the remaining stored entity;
   determining a length of the remaining stored entity; and
   determining a relative number of occurrences as the number of occurrences divided by the length, thereby yielding the degree of overlap.

3. The method of claim 2, wherein the step of determining a degree of overlap between the remaining text and the stored entity further comprises:
   determining a number of entities within the stored list of entities which comprises the remaining text;
   dividing the relative number of occurrences by the number of entities within the stored list of entities which comprises the remaining text, thereby yielding the degree of overlap.

4. The method of claim 1, wherein the step of determining a first informational entity further comprises:
   segmenting an entity of the set of informational entities stored on the computing device; and
   determining the degree of overlap between the remaining text and a segment of the entity of the set of informational entities stored on the computing device.

5. The method of claim 1, wherein the step of determining a first informational entity further comprises:
   determining an access frequency to an entity of the set of informational entities stored on the computing device; and
   weighting the degree of overlap of the entity by the access frequency.

6. The method of claim 1, further comprising:
determining a first plurality of associated entities; and
displaying indicia for the first plurality of associated entities by order of their degree of overlap.

7. The method of claim 6, further comprising:
determining a second plurality of entities which is associated with a second portion of the displayed text; wherein the second portion is different from the first portion of the displayed text;
determining the cut set of the first plurality of associated entities and the second plurality of associated entities;
if the size of the cut set is smaller than a threshold value, displaying the second plurality of associated entities;
if the size of the cut set is greater than the threshold value, displaying the entities comprised within the cut set.

8. The method of claim 1, wherein the step of determining a first informational entity further comprises:
   progressively extending the first portion of the displayed text used for determining an associated entity, thereby refining the determination of the first entity.

9. The method of claim 1, wherein
an entity of the set of informational entities is assigned to a universal category of a list of universal categories;
the list of universal categories comprises a category associated with "people", a category associated with "places", a category associated with "time", and a category associated with "things"; and
the first entity and the another entity are displayed according to their assigned universal category.

10. The method of claim 1, wherein
the text document is an electronic mail being composed by a user of the computing device; and
the displayed text is text from a "subject" line or a body portion of the electronic mail.

11. The method of claim 1, further comprising:
receiving the text document on the computing device;
opening the text document; and
scrolling through the text document, thereby displaying the text of the text document.

12. The method of claim 1, wherein an informational entity is a data file, comprising one or more of a music file, a picture file, a contact data file, a file representing a time instant, a file representing a location, an email file, and a document file.

13. A computing device comprising:
a display for displaying text of a text document;
a user interface for editing text of the text document;

a storage medium for storing a set of informational entities and a corresponding plurality of association records; wherein the association record corresponding to a first entity indicates an association and an association strength between the first entity and another entity; and a processor for automatically determining the first entity which is associated with a portion of the edited text; wherein the step of determining the first informational entity comprises determining a relevance score for at least two of the informational entities of the set of informational entities stored on the computing device; and determining the first informational entity as the informational entity having the highest relevance score, wherein determining the first informational entity comprises:

removing high frequency words from the first portion of the displayed text, thereby yielding a remaining text;

determining the relevance score as a degree of overlap between the remaining text and a plurality of informational entities of the set of informational entities stored on the computing device;

determining the first informational entity as the informational entity having the highest weighted degree of overlap; and wherein the high frequency words are stored in a list of high frequency words on the computing device; and/or the list of high frequency words comprises the words in a given language having a high frequency of occurrence within a text corpus of a given language;

wherein the display is further configured to automatically display an indicia for the first informational entity on the display.

14. A method for displaying an associated informational entity on a computing device when producing a text document; wherein a set of informational entities is stored on the computing device; wherein the set of informational entities is stored with a corresponding plurality of association records; and wherein the association record corresponding to a first informational entity indicates an association and an association strength between the first informational entity and another informational entity; the method comprising:

editing text of the text document on the computing device;

automatically determining the first informational entity which is associated with a first portion of the edited text comprising the steps of:

determining a relevance score for at least two of the informational entities of the set of informational entities stored on the computing device; and determining the first informational entity as the informational entity having the highest relevance score determining a first plurality of associated entities;

automatically displaying an indicia for the first informational entity on the display;

thereafter determining a first plurality of associated entities;

displaying indicia for the first plurality of associated entities by order of their degree of overlap;

thereafter determining a second plurality of entities which is associated with a second portion of the displayed text; wherein the second portion is different from the first portion of the displayed text;

determining the cut set of the first plurality of associated entities and the second plurality of associated entities; and if the size of the cut set is smaller than a threshold value, displaying the second plurality of associated entities;

if the size of the cut set is greater than the threshold value, displaying the entities comprised within the cut set.

15. The method of claim 14 wherein the step of determining the first informational entity comprises:

removing high frequency words from the first portion of the displayed text, thereby yielding a remaining text;

determining the relevance score as a degree of overlap between the remaining text and a plurality of informational entities of the set of informational entities stored on the computing device;

determining the first informational entity as the informational entity having the highest weighted degree of overlap; and wherein the high frequency words are stored in a list of high frequency words on the computing device; and/or the list of high frequency words comprises the words in a given language having a high frequency of occurrence within a text corpus of a given language.

16. The method of claim 14 wherein the step of determining a degree of overlap between the remaining text and a stored entity comprises:

removing the high frequency words from the stored entity, thereby yielding a remaining stored entity;

determining a number of occurrences of the remaining text in the remaining stored entity;

determining a length of the remaining stored entity;

determining a relative number of occurrences as the number of occurrences divided by the length, thereby yielding the degree of overlap;

determining a number of entities within the stored list of entities which comprises the remaining text; and dividing the relative number of occurrences by the number of entities within the stored list of entities which comprises the remaining text, thereby yielding the degree of overlap.

17. The method of claim 14, further comprising:

receiving the text document on the computing device;

opening the text document; and scrolling through the text document, thereby displaying the text of the text document.

18. The method of claim 14, wherein an informational entity is a data file comprising one or more of a music file, a picture file, a contact data file, a file representing a time instant, a file representing a location, an email file, and a document file.

* * * * *